United States Patent
Li et al.

(10) Patent No.: US 11,070,355 B2
(45) Date of Patent: Jul. 20, 2021

(54) PROFILE INSTALLATION BASED ON PRIVILEGE LEVEL

(71) Applicant: Apple Inc., Cupertino, CA (US)

(72) Inventors: Li Li, Los Altos, CA (US); Dennis D. Conway, Campbell, CA (US)

(73) Assignee: Apple Inc., Cupertino, CA (US)

( * ) Notice: Subject to any disclaimer, the term of this patent is extended or adjusted under 35 U.S.C. 154(b) by 295 days.

(21) Appl. No.: 16/024,025

(22) Filed: Jun. 29, 2018

(65) Prior Publication Data

US 2019/0007835 A1 Jan. 3, 2019

Related U.S. Application Data

(60) Provisional application No. 62/527,817, filed on Jun. 30, 2017.

(51) Int. Cl.

| | |
|---|---|
| *H04L 29/06* | (2006.01) |
| *H04L 9/00* | (2006.01) |
| *H04L 9/14* | (2006.01) |
| *H04L 9/32* | (2006.01) |
| *H04W 12/04* | (2021.01) |

(Continued)

(52) U.S. Cl.
CPC ............ *H04L 9/006* (2013.01); *H04L 9/0838* (2013.01); *H04L 9/14* (2013.01); *H04L 9/3247* (2013.01); *H04L 9/3268* (2013.01); *H04L 9/3271* (2013.01); *H04L 63/105* (2013.01); *H04W 12/04* (2013.01); *H04W 12/069* (2021.01); *H04W 12/08* (2013.01); *H04W 12/35* (2021.01); *H04W 12/37* (2021.01); *H04W 12/10* (2013.01); *H04W 12/40* (2021.01)

(58) Field of Classification Search
CPC ......... H04L 9/006; H04L 9/14; H04L 9/3247; H04L 9/3268; H04L 9/3271; H04L 9/0838; H04W 12/0609; H04W 12/0027; H04W 12/0023
See application file for complete search history.

(56) References Cited

U.S. PATENT DOCUMENTS 9,706,407 B2 *  7/2017  Seo .................... H04L 67/306
2005/0079863 A1   4/2005  Macaluso
(Continued)

OTHER PUBLICATIONS

"RSP Technical Specification, Version 2.1," GSM Association, Feb. 27, 2017, 247 pages.

*Primary Examiner* — Shin-Hon (Eric) Chen
(74) *Attorney, Agent, or Firm* — Dickinson Wright RLLP

(57) ABSTRACT

A secure element (SE) determines a profile type and a privilege level. The privilege level, in some embodiments, is associated with a key used successfully by the SE to verify a cryptographic signature. In some embodiments, the privilege level is indicated by a privilege value read from an extension field of a root certificate. The SE determines, in some instances, whether to accept or reject a profile installation after comparing the profile type with the determined privilege level. Thus, a test server is allowed to provision a test profile to an SE even if the test server does not have commercial certification required of an electronic subscriber identity module (eSIM) server that provisions operational profiles. Because the test profile does not include credentials useful for network access, the lower-security test server does not create a risk of improper access to the network of a mobile network operator (MNO).

20 Claims, 11 Drawing Sheets

(51) Int. Cl.
*H04L 9/08* (2006.01)
*H04W 12/08* (2021.01)
*H04W 12/30* (2021.01)
*H04W 12/37* (2021.01)
*H04W 12/069* (2021.01)
*H04W 12/10* (2021.01)
*H04W 12/40* (2021.01)

(56) References Cited

U.S. PATENT DOCUMENTS

| | | |
|---|---|---|
| 2005/0239504 A1 | 10/2005 | Ishii et al. |
| 2006/0135144 A1 | 6/2006 | Jothipragasam |
| 2016/0127132 A1* | 5/2016 | Lee .................. H04W 12/0023 713/156 |
| 2017/0064552 A1* | 3/2017 | Park .................. H04L 63/0869 |
| 2017/0142121 A1* | 5/2017 | Lee .................... H04L 63/102 |
| 2018/0084426 A1* | 3/2018 | Yang ..................... H04L 63/20 |
| 2018/0131699 A1* | 5/2018 | Park .................. H04L 63/0853 |
| 2018/0160294 A1* | 6/2018 | Lee ..................... H04W 12/10 |
| 2018/0234837 A1* | 8/2018 | Lee ..................... H04L 9/3271 |
| 2019/0230087 A1* | 7/2019 | Gharout ................ H04L 63/04 |

* cited by examiner

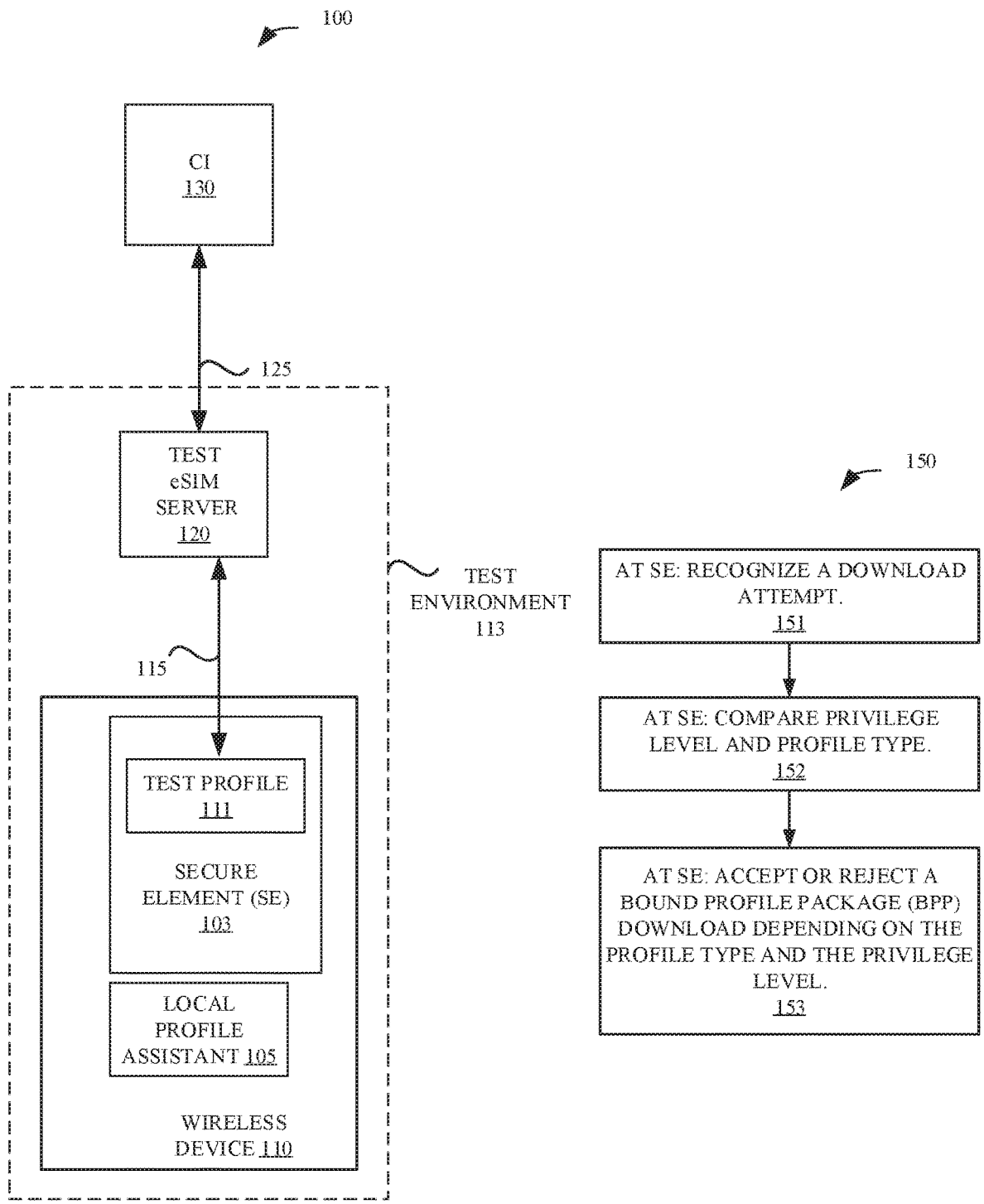
*FIG. 1A*  *FIG. 1B*

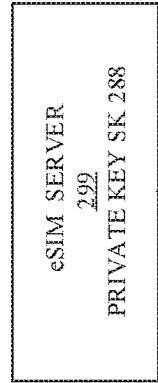
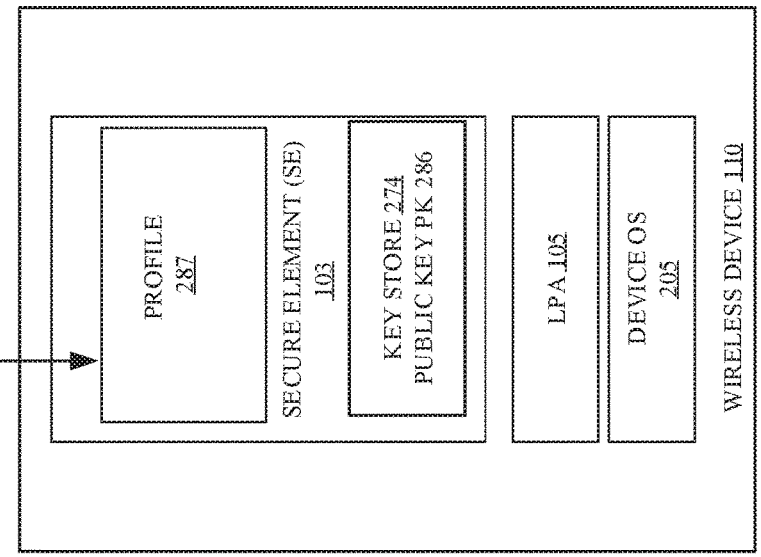
FIG. 2D
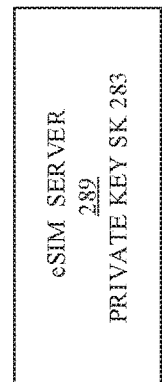
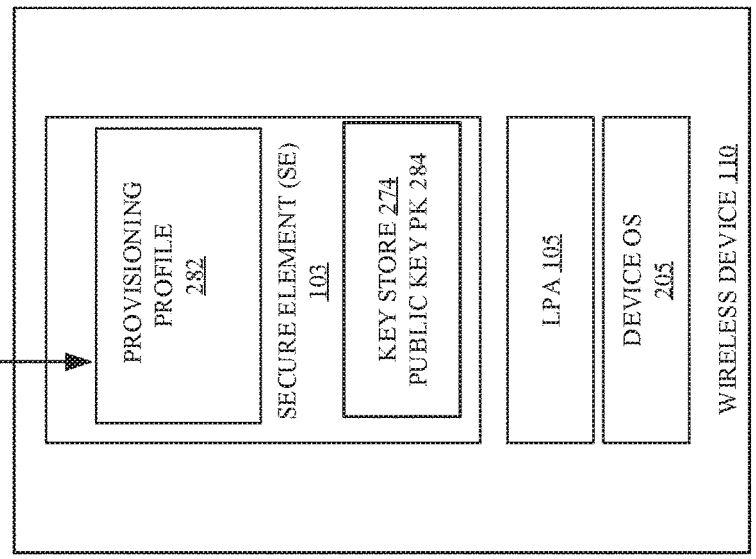
FIG. 2E

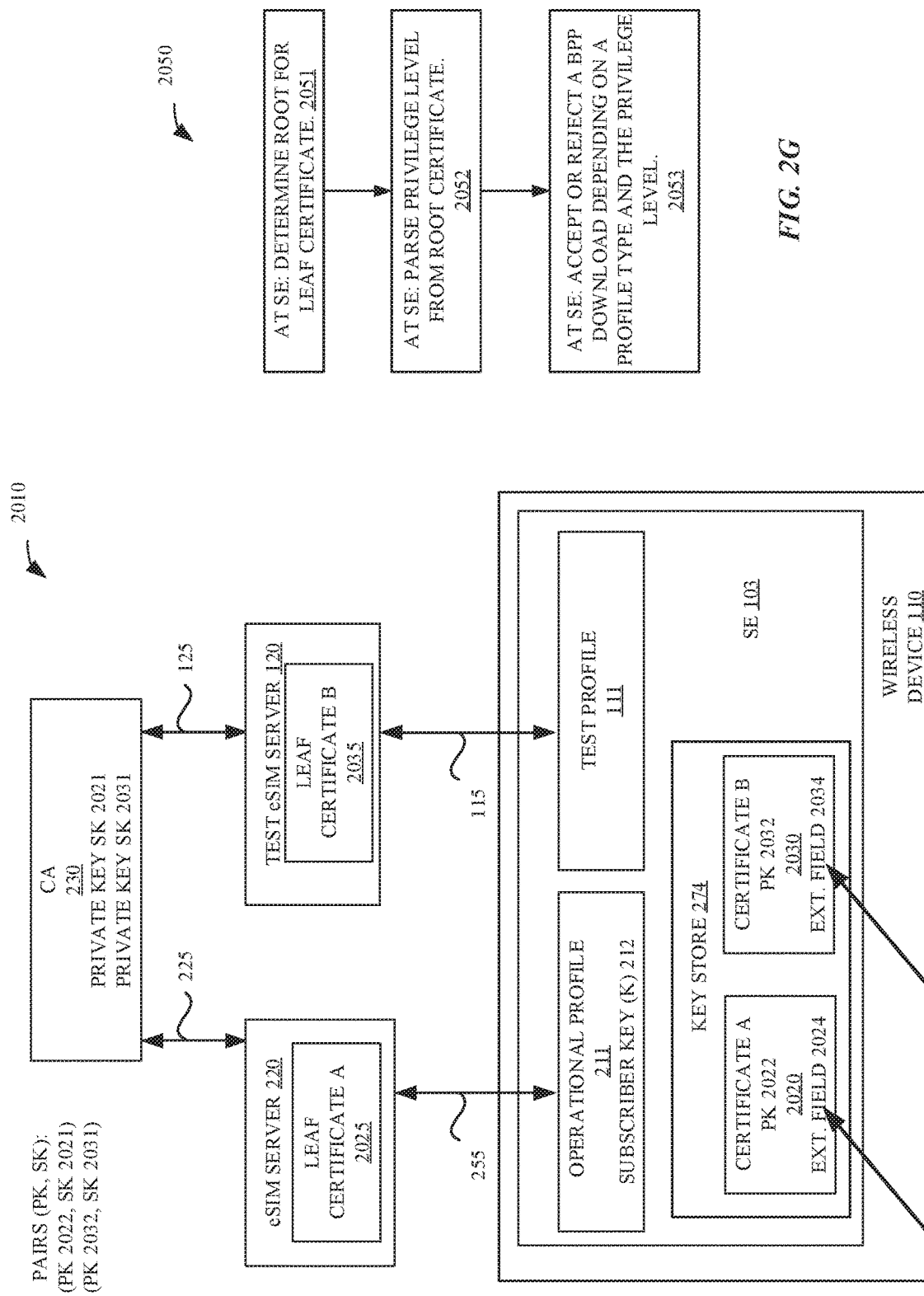

PROFILE INSTALLATION BASED ON PRIVILEGE LEVEL

CROSS-REFERENCE TO RELATED APPLICATIONS

This Application claims the benefit of U.S. Provisional Application No. 62/527,817, entitled "PROFILE INSTALLATION BASED ON PRIVILEGE LEVEL," filed Jun. 30, 2017, which is incorporated by reference herein in its entirety for all purposes.

FIELD

The described embodiments relate to profile installation on a secure element (SE) based on a privilege level.

BACKGROUND

A wireless device can be provisioned with a profile, also referred to herein as an electronic subscriber identity module (eSIM) on an embedded universal integrated circuit card (eUICC) or a subscriber identity module (SIM) on a UICC (or SIM card). Various network entities participate in provisioning of a profile or eSIM to a tamper resistant hardware secure element (SE), where the SE is present in a wireless device. To establish trust between communicating entities, public key infrastructure (PKI) techniques can be used.

Aspects of eSIM provisioning include the downloading, installing, enabling, disabling, switching and deleting of a profile on an eUICC or universal integrated circuit card (UICC). UICCs and eUICCs are SEs for hosting profiles. A profile may be an operational profile, a provisioning profile, or a test profile. An operational profile is a combination of operator data and applications provisioned on an SE in a wireless device for the purposes of providing services by an operator. An operational profile can contain secure data used to prove identity and thus verify contract rights to services. A profile can be identified by a unique number called an ICCID (Integrated Circuit Card Identifier).

During assembly of a wireless device, the SE, e.g., an eUICC, can be inserted into the wireless device. An eUICC may be identified by an eUICC identifier (EID). This application will generally refer to a SE as an overall term including both eUICCs and UICCs.

A wireless operator is a company providing wireless cellular network services. A mobile network operator (MNO) is an entity providing access capability and communication services to its subscribers through a mobile network infrastructure. In some cases, the wireless device is a user equipment (UE) used in conjunction with a UICC to connect to a mobile network. An end user or customer is a person using a wireless device. An enabled profile can include files and/or applications which are selectable over an UICC-wireless device interface. An architecture framework related to remote provisioning and management of secure elements in wireless devices is outlined in Global Systems for Mobility (GSM) Association (GSMA) document SGP.22: "RSP Technical Specification" (hereinafter "SGP.22").

Some useful vocabulary in the field of profile provisioning is now provided. A local profile assistant is a functional element in a wireless device that provides local profile download and local user interface features. An MNO is an entity that provides access capability and communication services to an end user through a mobile network infrastructure. An operational profile is a combination of operator data and applications to be provisioned on an SE for the purpose of providing services. A profile component is an element of a profile when installed on an SE and may be an element of a file system, an application, profile metadata including profile policy rules, or an MNO security domain (MNO-SD). Profile metadata is information pertinent to the profile used for the purpose of local profile management. A profile nickname is an alternative name for the profile that can be set by an end user. A profile type is an operator specific defined type of profile. A provisioning profile is a combination of operator data and applications to be provisioned on an SE for the purpose of providing connectivity to a mobile network for the purpose of provisioning profiles to the SE. A test profile is a combination of data and applications to be provisioned on an SE to provide connectivity to test equipment for the purpose of testing the wireless device and the SE. A test profile generally does not store any operator credentials. Further details on this vocabulary, including operational profiles, provisioning profiles, and test profiles, can be found in SGP.22.

A digital signature is authentication data that binds the identity of the signer to a data part of a signed message. A certificate issuer (CI) is a trusted third party whose signature on a certificate vouches for the authenticity of the public key of the associated user identity. A public key certificate may also be referred to herein simply as a certificate. Certificate distribution is part of an overall scheme called public key infrastructure (PKI). A user may store a copy of a certificate, where the certificate holds the name of a given party (user identity). The public key recorded in the certificate can be used to check the signature on a message signed using a private key of the given party. Further details with regard to PKI techniques can be found in SGP.22.

SUMMARY

Representative embodiments set forth herein disclose various systems and techniques for determining a privilege level and determining whether a profile associated with a particular profile type should be installed in an SE based on the privilege level.

An SE determines a profile type and a privilege level. The profile type may correspond to an operational profile, a provisioning profile, or a test profile. The privilege level, in some embodiments, is indicated by a key of the SE used successfully to verify a cryptographic signature. In some embodiments, the privilege level is indicated by a value read from an extension field of a certificate. The SE determines, in some instances, whether to accept or reject a profile installation after comparing the profile type with the determined privilege level. By means of this arrangement, a test server is allowed to provision a test profile to an SE even if the test server does not have the typical commercial certification required of an eSIM server that provisions operational profiles. Because the test profile does not include credentials useful for network access, the lower-security test server does not create a risk of improper access to the network of an MNO.

In one exemplary embodiment, the test server is external to the wireless device and SE under test and privilege level is determined by the SE successfully verifying a signature with a key, where the key itself is associated with a privilege level.

In another exemplary embodiment, the test server is external to the wireless device and SE under test and privilege level is determined by the SE reading a privilege value from an extension field of a certificate. In some embodiments, the extension field can be found in a root certificate. In some embodiments, the extension field can be found in a leaf certificate. The SE verifies a signature on the certificate with a public key. The public key does not tell the privilege level, but the certificate does tell the privilege level.

In yet another exemplary embodiment, the test server functionality is internal to the wireless device. The test server functionality is realized as an extension of a local profile assistant (LPA). The privilege level is determined by the SE successfully verifying a signature with a key, where the key itself is associated with a privilege level.

In an additional exemplary embodiment, the test server functionality is internal to the wireless device in the extension of the LPA, and the privilege level is determined by the SE reading the privilege value from the extension field of a certificate.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described will become apparent from the following Detailed Description, Figures, and Claims.

BRIEF DESCRIPTION OF THE DRAWINGS

The included drawings are for illustrative purposes and serve only to provide examples of possible structures and arrangements for the disclosed systems and techniques for intelligently and efficiently managing calls and other communications between multiple associated user wireless devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

FIG. 1A illustrates an exemplary system for provisioning a test profile to a secure element present in a wireless device, according to some embodiments.

FIG. 1B illustrates exemplary logic for comparing a privilege level with a profile type, according to some embodiments.

FIG. 2D illustrates exemplary details of the wireless device of FIG. 1 and an external server with privilege level for providing a provisioning profile, according to some embodiments.

FIG. 2E illustrates exemplary details of the wireless device of FIG. 1 and an external server with privilege level for providing certain profile types, according to some embodiments.

FIG. 2F illustrates exemplary details of the wireless device of FIG. 1 and privilege level indicated by root certificates, according to some embodiments.

FIG. 2G illustrates exemplary logic applicable to FIG. 2F, according to some embodiments.

DETAILED DESCRIPTION

Figure 2A:
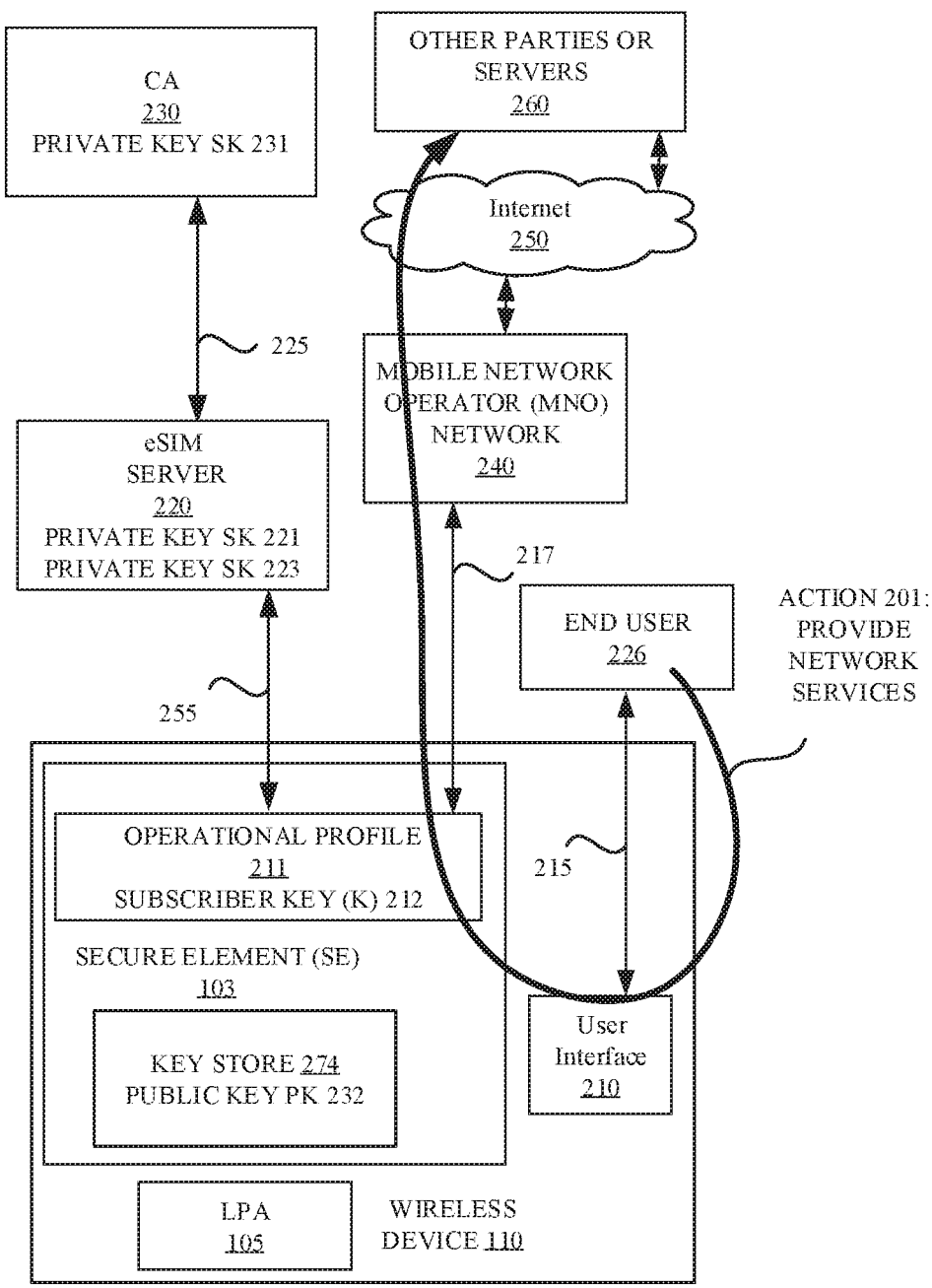
FIG. 2A illustrates use of an operational profile in the wireless device of FIG. 1, according to some embodiments.

Representative applications of apparatuses, systems, and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

A wireless device can be provisioned, by an eSIM server, with a profile. Many aspects of an SE and a wireless device can be tested without requiring an operational profile. Also, an operational profile includes MNO keys useful for providing access to a network of the MNO. Network access makes use of MNO resources and is provided by the MNO based on contract with the user accessing the MNO network using the profile. Thus, an operational profile represents an economically valuable resource that must be guarded from hackers or improper users. Thus, an eSIM server that provisions operational profiles must be GSMA security administration scheme (SAS) certified for security purposes.

Compromise (e.g., theft) of a test profile does not represent the same exposure to an MNO that an improper copy of an operational profile represents. SAS certification of a test eSIM server in a factory test environment can be difficult since the factory may be a contract facility and the MNO is not in a trust relationship with the factory. In embodiments presented herein, a test eSIM server is provided that only provides test profiles, not operational profiles, to an SE. In embodiments provided herein, the SE recognizes a limited privilege level for installation of test profiles.

In some embodiments, the SE determines a privilege level of a provisioning attempt based on successful signature verification. In an alternative embodiment, the SE determines a privilege level of a provisioning attempt based on a value read from an extension field of a certificate.

Before describing the methods, servers, and wireless devices involved with this solution, eSIM (profile) provisioning and PKI techniques will be described to aid in the subsequent discussion.

eSIM Provisioning

A function which provides profile packages is known as a subscription manager data preparation (SM-DP, or SM-DP+). An SM-DP may also be referred to as a profile provider, an eSIM server, an eSIM delivery server, or as an eSIM vendor. An eSIM is an electronic SIM. A physical SIM can be an electronic card, which can be inserted into a wireless device. An eSIM is an example of a profile. A profile package can be a personalized profile using an interoperable description format that is transmitted to a UICC as the basis for loading and installing a profile. Profile data which is unique to a subscriber, e.g., a phone number or an International Mobile Subscriber Identity (IMSI), are examples of personalization data. The SM-DP communicates over an interface with a UICC. Certificates used for authentication and confidentiality purposes can be generated by a trusted certificate issuer.

UICC (SE) Description

Some aspects of an SE will be described here with respect to a UICC. A UICC includes an operating system, and the operating system can include ability to provide authentication algorithms to network access applications associated with a given operator. The operating system also can include the ability to translate profile package data into an installed profile using a specific internal format of the UICC. In some embodiments, the UICC is an embedded UICC (eUICC). An ISD-P (issuer security domain-profile) can host a unique profile within a UICC. The ISD-P is a secure container or security domain for the hosting of the profile. The ISD-P is used for profile download and installation based on a received bound profile package. A bound profile package is a profile package which has been encrypted for a target UICC. An ISD-R (issuer security domain-root) is a function in a eUICC responsible for the creation of new ISD-Ps on the UICC. An ECASD (embedded UICC controlling authority security domain) provides secure storage of credentials required to support the security domains on a UICC. A controlling authority security domain (CASD) may also be referred to as a "key store" herein. A security domain within the UICC contains the operator's over the air (OTA) keys and provides a secure OTA channel. OTA keys are credentials used by an operator for remote management of operator profiles on a UICC.

Some activities related to a UICC resident in a wireless device may be performed by the wireless device. Examples of such activities are profile download assistance and local user interface functions. More information on profile download assistance and local user interface functions can be found in SGP.22.

Public Key Infrastructure Techniques

Communications of a UICC may be authenticated using PKI techniques. The techniques disclosed herein are applicable to eUICCs, UICCs, and SEs. Certificates used for authentication and confidentiality purposes can be generated by a trusted certificate issuer (CI or root CA). A public-key certificate may also be referred to herein simply as a certificate.

A user may store a copy of a certificate, where the certificate holds the name of a given party (user identity). The public key recorded in the certificate can be used to check the signature on a message signed using a PKI private key of the given party. A user or message recipient may use an on-line protocol such as on-line certificate status protocol (OCSP) to determine if a certificate is valid.

The UICC operating system can include ability to provide authentication algorithms to network access applications associated with a given operator. The operating system also can include the ability to translate profile package data into an installed profile using a specific internal format of the UICC. An ECASD provides secure storage of credentials required to support the security domains on the UICC. A controlling authority security domain (CASD) may also be referred to as a "key store" herein.

A signature as described herein is a digital signature. A digital signature is a data string which associates a message with some originating entity. Verification of a digital signature verifies that the signature is authentic, i.e., was created by the originating entity. One digital signature scheme relies on a public key-private key pair. The public key may be referred to with the acronym PK, and the private key may be referred to by the acronym SK (secret key). Suppose a sender associated with the pair (PK, SK) computes a signature S by signing with the private key SK over a message M. The sender distributes S and a certificate holding PK to the recipient. The recipient attempts to recover the message M by applying PK to the signature S and obtaining a result M~. Various verification schemes are possible for the sender to know that M~ is acceptable (i.e., corresponds to the sender's message M) or that M~ should be rejected (i.e., signature verification fails).

The certificate is signed by someone that the recipient trusts and this is why the recipient believes the PK is associated with the sender. When PK is successfully used by the recipient to verify S, the recipient knows that the message M came from the sender because only the sender knows SK.

Test System, Privilege Logic

FIG. 1A illustrates a system 100 including a wireless device 110 in communication with a test eSIM server 120 via a test connection 115. The wireless device 110 includes an SE 103 and a local profile assistant (LPA) 105. A test profile 111 has been installed on the SE 103. A test environment 113 is indicated by a dashed box including the test eSIM server 120, the SE 103 with test profile 111, and the LPA 105. In some embodiments, test environment 113 may occur in a contract factory situation in which the SE 103 and the wireless device 110 are under test. In an alternative embodiment, the LPA 105 hosts test eSIM server functionality and test environment 113 does not include the test eSIM server 120 as a stand-alone server. For example, in some instances a user of the wireless device 110 brings the wireless device 110 into a customer care facility of the MNO or of the wireless device manufacturer (e.g., retail outlet). While at the customer care facility, the test profile 111 is provisioned, in some embodiments, by an LPA extension described below.

FIG. 1B illustrates exemplary logic 150 realized by the SE 103 of FIG. 1A. A server such as test eSIM server 120 attempts to download a bound profile package (BPP) including profile components to the SE. At 151, the SE recognizes the profile download attempt. At 152, the SE compares a privilege level with a profile type. At 153, if the privilege level permits installation of a profile of the profile type, then the SE accepts the BPP download. If the privilege level does not permit installation of a profile of the profile type, the SE rejects the download attempt.

Certificate Issuer (CI) 130 may sign a PKI certificate of the test eSIM server 120, e.g., via connection 125, in some embodiments. In some instances, CI 130 may be a trusted third party CI for supporting conventional PKI infrastructure. In some instances, CI 130 may represent an independent root separate from conventional PKI infrastructure. In the latter case, CI 130 may be privately operated by an original equipment manufacturer (OEM) of wireless device exemplified by the wireless device 110.

Subsequent figures and description include explanations of different profile types and how profile type and privilege level are determined, according to some embodiments.

Operational Profile Example

FIG. 2A illustrates a diagram 200 of use of an operational profile 211, which includes a subscriber key K 212, by the wireless device 110. An eSIM server 220, in some instances, has provided the operational profile 211 to the SE 103 at some earlier point in time, e.g., via connection 255.

As a brief aside, FIG. 2A illustrates some PKI techniques including SE 103 placing trust in the eSIM server 220 based on a certificate signed by a certificate authority (CA) 230, where the eSIM server 220 communicates with CA 230 via connection 225. In particular, the eSIM server 220 is in possession of a private key SK 221. The public key corresponding to SK 221 is distributed in a certificate naming the eSIM server 220 and signed by CA 230 using its private key SK 231. When the SE 103 receives a particular message from the eSIM server 220 signed with the private key SK 221, it takes steps to verify authenticity. SE 103 checks that the certificate it holds for the eSIM server 220 can be verified using the public key PK 232 (corresponding to SK 231) and then SE 103 verifies the signature on the particular message using the public key corresponding to SK 221. Thus, CA 230 represents a trusted root. Public keys can be stored in a key store 274. The key store 274, in some embodiments, resides in non-volatile memory and key values are burned into the key store 274 at the time of manufacture of the SE 103.

The eSIM server 220 is GSMA SAS certified. A certificate including the public key of the eSIM server 220 PK 222 has been signed using a private key of CA 230. Another certificate, in some embodiments, holds PK 224 and is signed by CA 230. The CA 230 is a trusted third-party certificate authority used to support a conventional PKI infrastructure.

An action 201 is indicated with a heavy curved line. The end user 226 wishes to reach other parties or servers 260. The end user 226 operates the user interface 210 of the wireless device 110, e.g., via interactive path 215, and initiates, for example, a voice call or a data session. The wireless device 110 will cooperate with the SE 103 to authenticate with the MNO network 240 and establish the call. The authentication may take place before the end user 226 activity. For example, the authentication may be part of a conventional authentication and key agreement (AKA) procedure which is based on the MNO recognizing a cryptographic result provided by the SE 103 based on K 212. The key K 212 is an example of a shared secret. Both the operational profile 211 and the MNO network 240 are in possession of K 212. The AKA procedure relies on this shared secret for authentication and for establishment of session keys. Key points from FIG. 2A are that: i) the eSIM server 220 is GSMA SAS certified, and ii) the operational profile 211 includes the key K 212 which enables access to voice and data services of the MNO network 240 via a wireless connection 217.

Examples of Learning Privilege and Installing a Test Profile

In some embodiments, privilege is learned either based on signature verification or from a certificate. Test profile installation may be performed by an external server or by an LPA extension. Example figure portions related to these possibilities are noted in Table 1.

TABLE 1

Some Aspects in Determining Privilege for Installation of a Profile

Figures 2B, 2C:
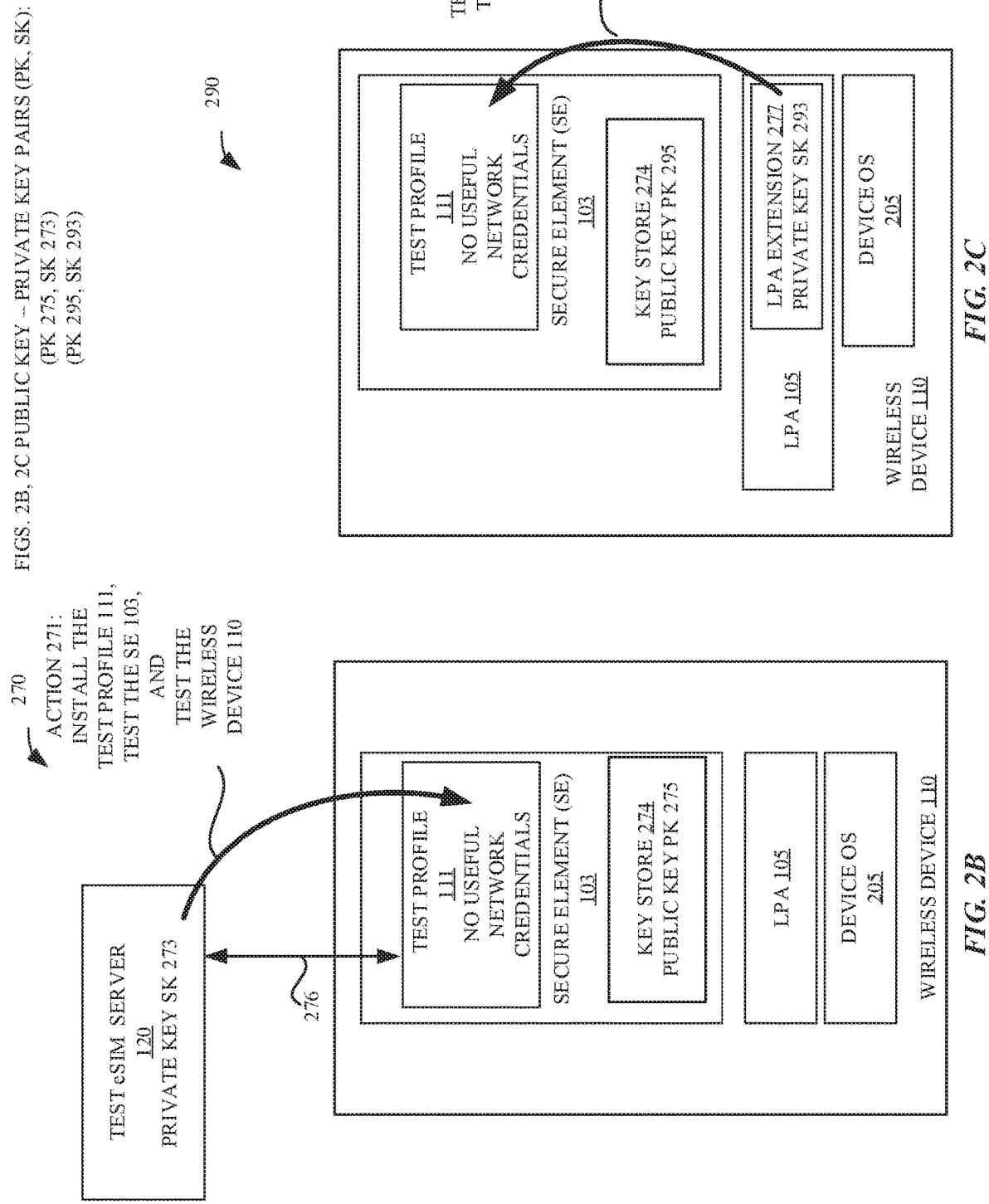
FIG. 2B illustrates exemplary details of the wireless device of FIG. 1 and an external server, according to some embodiments.
FIG. 2C illustrates exemplary details of the wireless device of FIG. 1 and server functions performed within the wireless device, according to some embodiments.

| Server Nature | Examples of Determining Privilege | |
|---|---|---|
| | Signature Embodiment | Certificate Embodiment |
| External | FIG. 2B, PK 275 and test eSIM server 120 | FIG. 2F certificate A and certificate B of CA 230; FIG. 4 certificate 329 and test eSIM server 120. |
| LPA Extension | FIG. 2C, PK 295 and LPA extension 277 | FIG. 3 activity 309 (including certificate 329 with extension field 332) can originate at LPA extension 277 |

Test Profile Installation Based on Privilege

FIGS. 2B and 2C illustrate diagrams 270 and 290 that provide embodiments for installing a test profile based on a privilege level. Activities of the wireless device 110 are generally coordinated by a device operating system (OS) 205. These figures emphasize that the eSIM test server function may be in a hardware entity distinct from wireless device 110 (FIG. 2B), or that the eSIM test server function may be realized by an LPA extension 277 of the LPA 105 (FIG. 2C). Privilege level, in some embodiments, is determined based on a key that successfully validates a signature. An alternative mechanism, equally applicable to FIGS. 2B and 2C, is that privilege level is determined based on a privilege value parsed from an extension field of a certificate. More about the certificate approach will be provided in FIGS. 3-5.

FIG. 2B illustrates, with a heavy curved arrow, action 271. Action 271 includes installation of the test profile 111 in the SE 103 by coordinated efforts of the test eSIM server 120, the LPA 105 and the SE 103. An annotation in the figures notes that the test profile 111 has no useful network credentials. In other words, the test profile 111 is unable to perform the AKA operation underlying action 201 in FIG. 2A.

The test eSIM server 120 communicates with the SE 103 via an interface 276. Examples of server/SE interfaces can be found in SGP.22. In some embodiments, the test eSIM server 120 obtains a challenge value from the SE 103 and signs the challenge value with a private key SK 273. The SE 103 includes a key store 274 including the corresponding public key PK 275. That is, SK 273-PK 275 are a public key-private key pair associated with the test eSIM server 120. A certificate of the test eSIM server 120 may be signed by CI 130 or signed by CA 230. As mentioned above, in some embodiments, keys such as PK 275 are burned in to non-volatile memory of key store 274 at the time that SE 103 is manufactured. SE 103 associates PK 275 with a privilege level of installation of test profiles only (e.g., no privilege for operational profiles). In FIG. 2B, SE 103 performs logic 150 which results in installation of the test profile 111. The test eSIM server 120 then tests the SE 103 and the wireless device 110 using the test profile 111.

FIG. 2C is similar to FIG. 2B except that the test eSIM server function includes an LPA extension 277 within the wireless device 110. The LPA extension 277, in some embodiments, obtains a challenge from the SE 103 and signs it with the private key 293. The SE verifies the signature with public key PK 295. Similar to FIG. 2B, PK 295-SK 293 are a public key-private key pair used by wireless device 110. PK 295 is burned into non-volatile memory of SE 103 at the time of manufacture. For scalability, many wireless devices, possibly on the order of millions of distinct wireless devices, one of which being the wireless device 110, in some embodiments, are associated with the same pair PK 295-SK 293. In some embodiments, SK 293 is burned into non-volatile memory of wireless device 110 at the time of manufacture. Interfaces between an LPA and an SE are also described in SGP.22. Similar to FIG. 2B, SE 103 associates PK 295 with a privilege level of installation of test profiles only. In FIG. 2C, SE 103 performs logic 150 which results in installation of the test profile 111. The LPA extension 277 then continues with action 291 and tests the SE 103 and the wireless device 110 using the test profile 111.

For the signature embodiment, the SE maintains a key-privilege table. Each row of the table associates a privilege level with a public key. An example is provided in Table 2. The second column of Table 2 holds public key examples. The root server or root certificate is the holder of the corresponding private key. For example, PK 275 is associated with SK 273 of test eSIM server 120. The PKI certificate of the test eSIM server 120 used for Row 2 identifies the test eSIM server 120 and holds PK 275. This certificate is the root certificate of PK 275 and the test eSIM server represents the corresponding root server if the certificate is self-signed. In some embodiments, the certificate is signed by another server such as CI 130.

server functionality and has Root 2 privileges and can provision the test profile 111 to the SE 103. Tests using the installed test profile can then commence in places other than a factory, for example, at a customer care facility of MNO.

FIG. 2D illustrates a diagram 280 of an embodiment corresponding to Row 3 of Table 2. An eSIM server 289 signs a message using private key SK 283. The SE 103 verifies the signature using PK 284. From Table 2, the SE 103 associates a privilege level permitting the eSIM server 289 to install a profile having a profile type of provisioning profile. An exemplary provisioning profile 282 is illustrated in FIG. 2D. If the eSIM server 289 attempts to download an operational profile and signs the associated message with SK 283, the attempted download will be rejected by the SE 103 because the operational profile type appears in the disallowed profile column of Table 2.

FIG. 2E illustrates a diagram 285 an embodiment corresponding to Row 4 of Table 2. An eSIM server 299 signs a message using private key SK 288. The SE 103 verifies the signature using PK 286. From Table 2, the SE 103 associates a privilege level permitting the eSIM server 299 to install a profile 287 having a profile type of test profile or operational profile.

Relationship of Rows, and Extension Field in Certificate Embodiment

Table 3 provides an exemplary embodiment in which privilege level is determined based on a certificate extension

TABLE 2

Key - Privilege Table, Signature Embodiment

| Row ("Root") | Public Key | Private Key | Trust Based On | Privilege Level of PK (approved to install this profile type) | Disallowed Profile Type for PK (not approved to install this profile type) |
|---|---|---|---|---|---|
| 1 | PK 222 | SK 221 | CA 230 | High: Operational profile, provisioning profile, test profile | None |
| 2 | PK 275, PK 295, PK 224 | SK 273, SK 293, SK 223 | Test eSIM server 120, CI 130, or CA 230 | Low: Test profile | Operational profile, provisioning profile |
| 3 | PK 284 | SK 283 | eSIM server 289 | Medium: Provisioning profile | Operational profile |
| 4 | PK 286 | SK 288 | eSIM server 299 | Hybrid: Test profile, operational profile | None |

Row 2 represents a key-based level referred to herein as "Root 2." A server operating as Root 2 can be deployed in a contract factory in an environment that would not be satisfactory for GSMA SAS certification. If a server operating with Root 2 credentials attempts to install an operational or provisioning profile, the target SE will reject the installation because these profile types are listed in the disallowed profile type column of Table 2 on the Root 2 row (Row 2). In contrast, eSIM server 220 of FIG. 2A can perform at a key-based level of Root 1 or Root 2 depending if it signs a provisional download message with SK 221 or SK 223. SK 221 corresponds to PK 222 (Row 1) and SK 223 corresponds to PK 224 (Row 2). Although the eSIM server 220 is GSMA SAS certified and its certificates are signed by CA 230 using SK 231, the eSIM server 220 possesses separate certificates for PK 222 and PK 224 and SE 103 is able to associate privilege level of a download attempt based on the public key which successfully verifies the signature on an associated message. The LPA extension in the wireless device (see Table 1), in some embodiments, hosts test eSIM field. In some embodiments, certificates for each root are not delivered as part of the provisioning process, but are instead pre-installed on the eSIM server and on the SE.

TABLE 3

Certificate - Privilege Table, Certificate Embodiment

| Row ("Root") | Privilege Level Indicated in Extension Field of Root Certificate (approved to install this profile type) | Disallowed Profile Type Indicated in Extension Field of Root Certificate (not approved to install this profile type) |
|---|---|---|
| 1 | High: Operational profile, provisioning profile, test profile | None |
| 2 | Low: Test profile | Operational profile, provisioning profile |
| 3 | Medium: Provisioning profile | Operational profile |
| 4 | Hybrid: Test profile, operational profile | None |

FIG. 2F illustrates a diagram 2010 of a certificate embodiment in which CA 230 possesses a public key-private key pair (PK 2022, SK 2021) for Root 1 and a pair (PK 2032, SK 2031) for Root 2. CA 230 creates a certificate A (denoted 2020) populates extension field 2024 with a value indicating Root 1 and signs it with SK 2021. Similarly, CA 230 creates a certificate B (denoted 2030) populates extension field 2034 with a value indicating Root 2 and signs it with SK 2031. Thus, privilege level is indicated, in some embodiments, in extension fields of root certificates.

Certificates A 2020 and B 2032 are pre-provisioned in SE 103, e.g., at the time of manufacture of SE 103. In FIG. 2F, these certificates are stored in key store 274; they may be stored elsewhere in SE 103. In some embodiments, CA 230 distributes trust by signing, using SK 2021, a leaf certificate A (denoted 2025) including an identifier of the eSIM server 220. CA 230 signs, using SK 2031, a leaf certificate B (denoted 2035) including an identifier of the test eSIM server 2035. Leaf certificates A (2025) and B (2035), in some embodiments, are pre-provisioned to the eSIM server 220 and the test eSIM server 120 before an attempted download of a BPP to the SE 103. In some embodiments, the leaf certificates are not configured with extension fields.

Public key-private key pairs are associated with eSIM server 220 and the test eSIM server 120. For example, leaf certificate B (2035) provides PK 275 and is signed over with SK 2031. The private key corresponding to PK 275 is SK 273 (see FIG. 2B). During an attempted download, the test eSIM server 120 signs over a challenge using SK 273. SE 103 successfully verifies the signature using PK 275. In the certificate embodiment of FIGS. 2F and 2G, SE 103 then looks to an extension field of the root certificate that validates the leaf certificate B. In this instance, that root certificate is certificate B (2032) and the extension field value is Root 2; SE 103 will only allow provisioning of a test profile when the download attempt is based on leaf certificate B since leaf certificate B descends from certificate B (2032) and the extension field of certificate B holds the value Root 2.

FIG. 2G illustrates logic 2050 applicable to FIG. 2F. The starting conditions are similar to logic 150, the SE recognizes a download attempt (not shown in FIG. 2G). At 2051, the SE determines a root certificate for a leaf certificate. At 2052, the privilege level for the download attempt associated with the leaf certificate is parsed from the root certificate. At 2053, similar to 153 of FIG. 1B, the SE accepts or rejects the attempted download of a BPP based on comparing the privilege level parsed from the root certificate with a type (operational, test, provisioning, other) of the profile associated with the BPP.

In some embodiments, leaf certificates include a subset of the root privilege level. In some embodiments, this is achieved by including an extension field with a privilege level value in the leaf certificate. That is, when considering a given row associated with a root, the number of allowed profile types from Table 3 for a leaf certificate may be fewer than those associated with the root, and the corresponding number of disallowed profile types for the leaf certificate is then greater than in Table 3 for the same row.

Message Flow Overview

Figure 3:
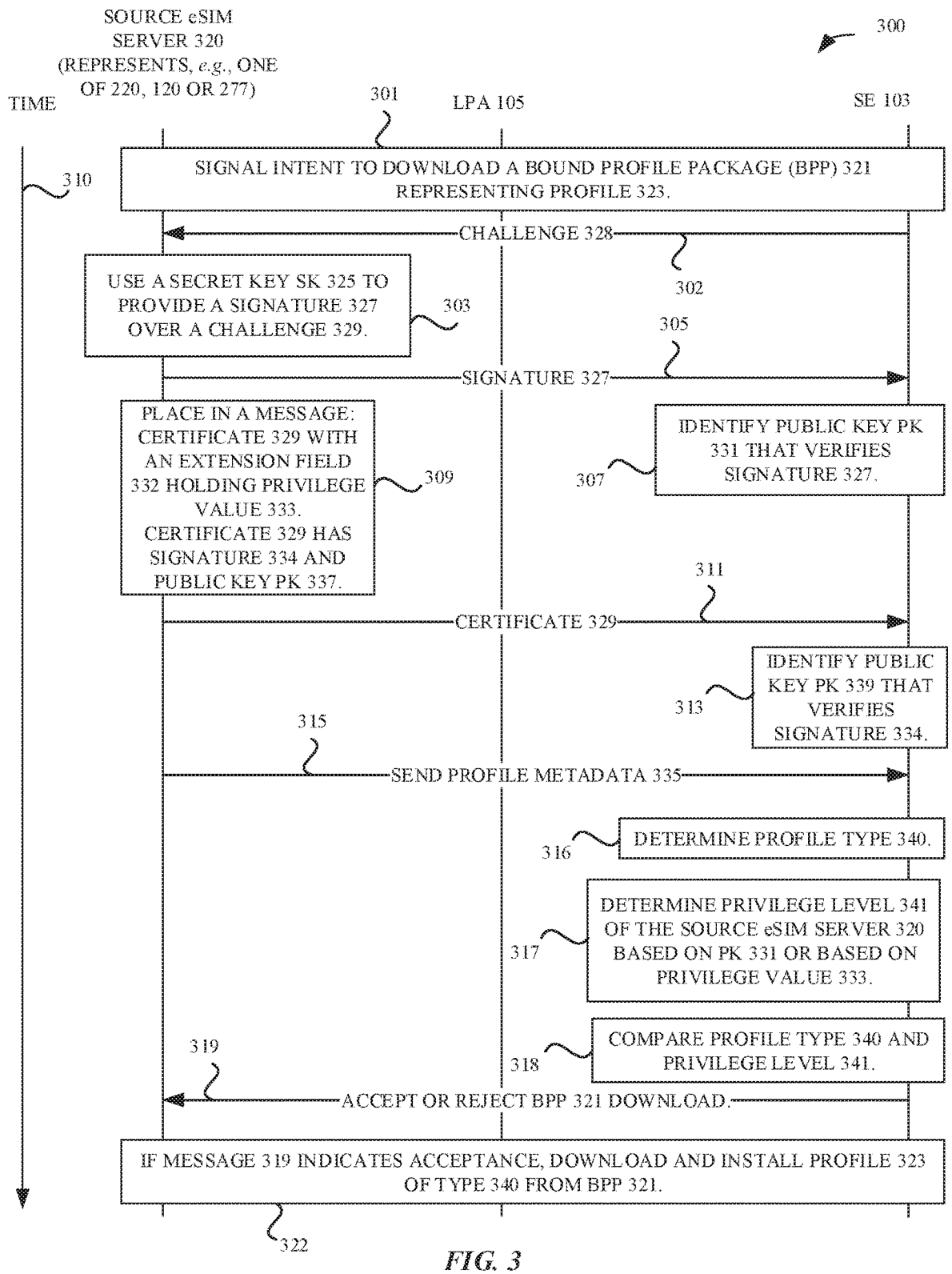
FIG. 3 illustrates exemplary details of a message flow for determining whether to install a profile based on a privilege level, according to some embodiments.
Figure 4:
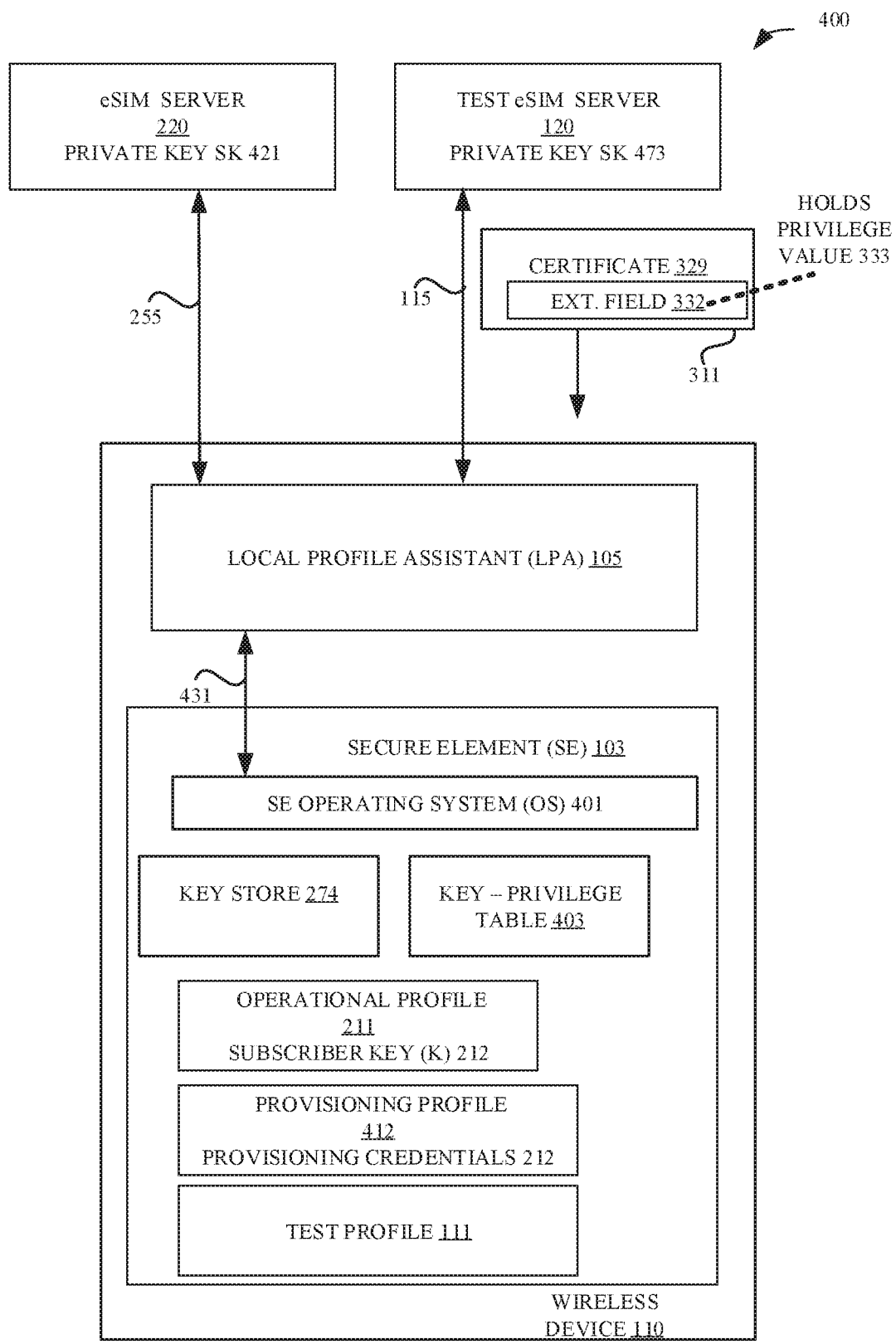
FIG. 4 illustrates exemplary details of the wireless device of FIG. 1 including delivery of a certificate and various profile types, according to some embodiments.

FIG. 3 is an exemplary message flow 300 showing some messages and activities associated with determining, based on a privilege level, whether to install a profile. A timeline 310 shows that time advances from top to bottom. A source eSIM server 320 communicates with an SE 103, possibly via the LPA 105. The source eSIM server 320 represents any of the test eSIM server 120, the eSIM server 220, the LPA extension 277, the eSIM server 289, or the eSIM server 299. In other words, the label "source eSIM server 320" is a placeholder reference for any of the eSIM servers discussed heretofore and for the LPA extension 277. In the LPA extension 277 case, source eSIM server 320 represents server functionality, not a stand-alone server. The action begins with activity 301 at the top. The LPA 105, SE 103 or the source eSIM server 320 indicate an intention to download a BPP 321 representing a profile 323 to the SE 103.

LPA 105 is illustrated in the activities of message flow 300. Messages may be processed or forwarded by LPA 105 in a conventional manner such as found in SGP.22. As mentioned above, in the case of LPA extension 277, activities associated with LPA extension 277 are represented by the activities of the source eSIM server 320 indicated in the upper left of FIG. 3.

A challenge 328 is provided from the SE 103 to the source eSIM server 320 (message 302). 301 and 302 generally belong to a class of information exchange which is considered handshaking. In some embodiments, the SE 103 indicates during handshaking which row or rows of Table 2 that SE 103 supports, and, before 303, the source eSIM server 320 selects from those rows a corresponding private key SK from the Private Key column that it will use. The selections open to the source eSIM server 320 may be limited since some servers only support one row of Table 2; e.g., test eSIM server 120 only supports Row 2 ("Root 2"). The selected SK is referred to as SK 325 in FIG. 3.

At 303, the source eSIM server uses a private key SK 325 to sign over the challenge 328 to produce a signature 327. SK 325 is, for example, one of the private keys in the Private Key column of Table 2. In an instance of the eSIM server 220, SK 221 or SK 223 will be used depending on the privilege level that the eSIM server 220 intends to indicate to the SE 103. In the case of the test eSIM server 120, the only possible privilege level is that associated with PK 275, test profile only (Row 2 of Table 2, a privilege level referred to generally herein as Root 2). The message 305 conveys the signature 327 to the SE 103.

The SE 103, at activity 307, uses Table 2 to identify a public key PK 331 that verifies the signature 327. In the example of FIG. 3, PK 331 can be any of the public keys enumerated in the "Public Key" column of Table 2. In the signature embodiment of Table 1, this verification reveals, by way of Table 2, the privilege level to be associated with the BPP.

FIG. 3 also illustrates the certificate embodiment indicated in Table 1. In the certificate embodiment, the source eSIM server 320, at 309, places a certificate 329 in a message. The certificate 329 includes an extension field 332 holding a privilege value 333. The certificate 329 identifies the source eSIM server 320 and holds a public key PK 337 of the source eSIM server. The certificate 329 is signed (either self-signed or signed by a server higher in a chain of trust) with a signature 334. Message 311 represents transmission of the certificate 329 to the SE 103. Message 311 may occur at the time of the attempted profile installation, or at some earlier time. If message 311 occurs at an earlier unrelated time, then the SE 103 has stored the certificate 329 and the certificate 329 can be verified by the SE 103 at the time of profile installation as fresh using conventional certificate revocation list (CRL) techniques.

At 313, the SE 103 identifies a public key PK 339 useful for verifying the signature 334. The signature 334 is not being used here to communicate privilege level.

Message 315 conveys profile metadata 335 to the SE 103. The profile metadata 335 includes profile type information.

At 316, the SE 103 uses the profile metadata 335 to determine the profile type 340 of the profile corresponding to BPP 321.

The SE 103, at 317, determines a privilege level 341 of the source eSIM server 320 based on PK 331 (used to create signature 327) or based on privilege value 333 (read from extension field 332 of the certificate 329). If a certificate with extension field 332 is delivered as part of the download process (message flow 300), then the certificate extension field is the default embodiment used to determine privilege level. The privilege level can be, for example, "Root 1", "Root 2," etc. As an alternative, the privilege level may be a string such as "operational profile allowed," "test profile only allowed", etc.

Activity 318 is an example of logic 152 of FIG. 1B. The SE 103 compares the profile type 340 and the privilege level 341 using, for example, Table 2. If the profile type 340 is in agreement with the privilege level 341, then the message 319 indicates acceptance of a download of the BPP 321. At 322, in the case of acceptance, a conventional download and installation of the profile 323 from the BPP 321 occurs.

However, if privilege level 341 is inadequate for the profile type, then the message 319 indicates rejection of a download of the BPP 321.

Example System Elements

FIG. 4 illustrates further system elements 400 to assist in understanding of the embodiments provided herein. The eSIM server 220 is shown to possess a private key SK 421. SK 421, can be, for example, SK 221 or SK 223. The test eSIM server 120 holds private key SK 473. SK 473 can be, for example, SK 273 or SK 293. The test eSIM server 120 is shown as external but may alternatively be internal functionality as in LPA extension 277 of FIG. 2C.

The test eSIM server 120 is shown providing the message 311 holding the certificate 329 with extension field 332. The extension field 332 holds privilege value 333.

The LPA 105 communicates with the SE 103 OS 401 via an interface 431. Such interfaces are described in SGP.22. The SE 103 includes key store 274 for storing public keys or certificates. In some embodiments, key store 274 is realized using a non-volatile memory. One or more of the public keys illustrated in the Public Key column of Table 2 are stored (i.e., "burned") into key store 274 at the time that SE 103 is manufactured. SE 103 also includes key-privilege table 403. Table 2 is an exemplary representation of the information stored in key-privilege table 403. Also present in SE 103 for illustration are the operational profile 211, a provisioning profile 412 and the test profile 111.

The provisioning profile 412 includes provisioning credentials 212. The provisioning credentials 212 may be PKI based (i.e., public keys of trusted provisioning servers and a private key for proving authenticity of provisioning profile 412) and/or shared-secret based (e.g., a code is stored that authenticates provisioning profile 412 to a provisioning server).

SE Logic

Figure 5:
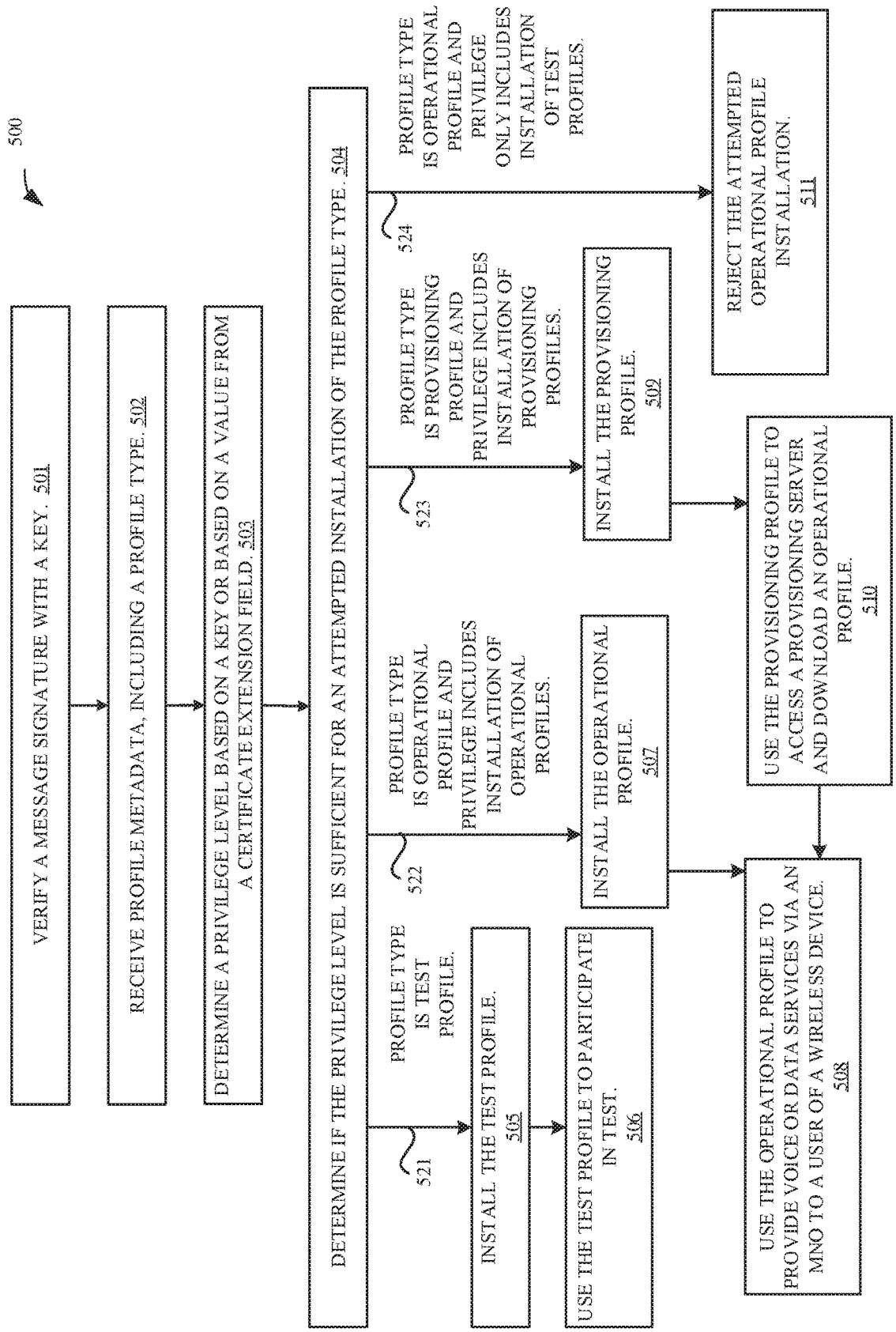
FIG. 5 illustrates exemplary logic for determining whether to install a profile based on a privilege level, according to some embodiments.

FIG. 5 illustrates exemplary SE logic 500. Logic 500 provides a view of message flow 300 from the point of the SE 103. Logic 500 also explicitly illustrates some scenarios not specifically spelled out in message flow 300.

At 501, an SE verifies a message signature with a key. The message signature, in some embodiments, is the signature of an eSIM server. This signature is comparable to signature 327 of FIG. 3. At 502, the SE receives profile metadata, including a profile type. The profile metadata is comparable to metadata 335 of FIG. 3. At 503, the SE determines a privilege level based on a key or based on a value from a certificate extension field (similar to, as described with reference to FIG. 3, at 317, determining a privilege level 341 based on PK 331 or based on privilege value 333).

At 504 the privilege level and the profile type are compared and a decision taken as to installing the profile. 504 is comparable to activity 318.

Path 521 corresponds to determining a privilege level that includes installation of test profiles and the profile type is the test profile type. The logic then flows from 504 to 505 and the test profile is installed. This is one example of activity 322. After installation, at 506, the test profile is used to test the SE and/or a wireless device in which the SE is present. The test may include sending one or more profile management commands to the SE. Exemplary profile management commands include an enable profile command, a disable profile command, a delete profile command, a list profiles command, and a set nickname profile command. SGP.22 provides examples of profile management commands.

Path 522 corresponds to determining the profile type to be the operational profile type and determining that the privilege level allows installation of an operational profile from this source. The logic flows from 504 to 507 and the operational profile is installed. After installation of the operational profile, the logic flows to 508 and a user of the wireless device can access voice or data services from an MNO, e.g., MNO network 240.

Path 523 corresponds to determining the profile type to be the provisioning profile type and determining that the privilege level allows installation of a provisioning profile from this source. The logic flows from 504 to 509 and the provisioning profile is installed. After installation of the provisioning profile, the logic flows to 510 and an operational profile may be downloaded from a provisioning server, e.g., the eSIM server 220. From 510 the logic flows to 508 and the user obtains network services.

For example, 509 followed by 510 followed by 508 can represent an embodiment including, subsequent to the installing the provisioning profile on the SE at 509, performing a first authentication and key agreement (AKA) transaction with a provisioning server. The first AKA uses credentials included in the provisioning profile. In an exemplary embodiment, the wireless device hosting the SE provides a user of the wireless device with data plan choices provided by the provisioning server. The wireless device then obtains a user input indicating a selected data plan. The wireless device then sends a message to the provisioning server indicating the selected data plan. The wireless device and SE then receive a second BPP. The wireless device then installs, in cooperation with the SE, an operational profile using profile components from the second BPP. The SE then performs a second AKA transaction with an MNO associated with the operational profile, wherein the second AKA uses a subscriber key (K) included in the operational profile. The wireless device then launches a voice or data application, where the voice or data application is supported by the MNO, and provides the user with service based on the voice or data application.

Path 524 corresponds to a rejected download attempt. In the example of FIG. 5 and path 524, the profile type is an operational profile but the privilege level only includes installation of test profiles. For instance, signature corresponding to Root 2 or Root 3 and a profile type of operational profile type would lead to path 524. The logic flows from 504 to 511 and the attempted installation of an operational profile is rejected.

SE Details

Figure 6:
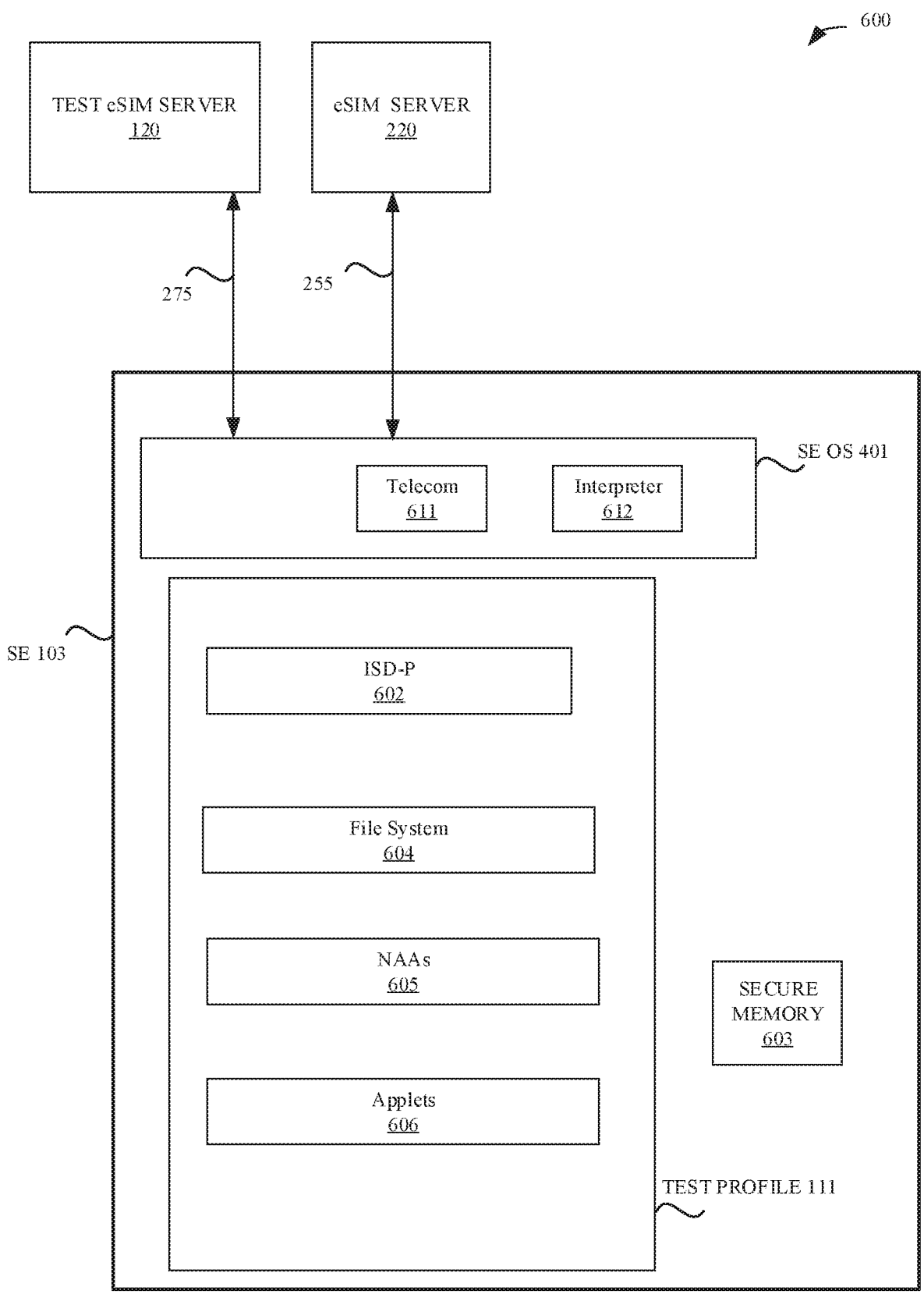
FIG. 6 illustrates exemplary details of an SE in communication with servers and with an eSIM installed, according to some embodiments.

FIG. 6 illustrates a system 600 with details of the SE 103 including the test profile 111. The test profile 111 is installed in the SE 103 of the wireless device 110 as indicated in FIG. 5 at 505. The SE 103 includes the operating system 401. Within the operating system 401 is a telecom framework 611 and an interpreter 612. The interpreter 612 translates profile package data into an installed profile using a specific internal format of the SE 103. ISD-P 602 hosts a profile, i.e., test profile 111, which may also include a file system 604, one or more network access applications (NAAs) 605, and one or more applets 606. The ISD-P is a secure container (security domain) for the hosting of the test profile 111. The ISD-P is used for eSIM (profile) download and installation in collaboration with the interpreter 612 for the decoding of a received BPP. An issuer security domain (not shown) on the SE 103 is responsible for the creation of new ISD-Ps on the SE 103 and the lifecycle management of all ISD-Ps on the SE 103. Secure memory 603, which can be an ECASD, provides secure storage of credentials required to support the security domains on SE 103. Further description of profile (eSIM) management can be found in SGP.22.

Example Wireless Device Connections

Figure 7:
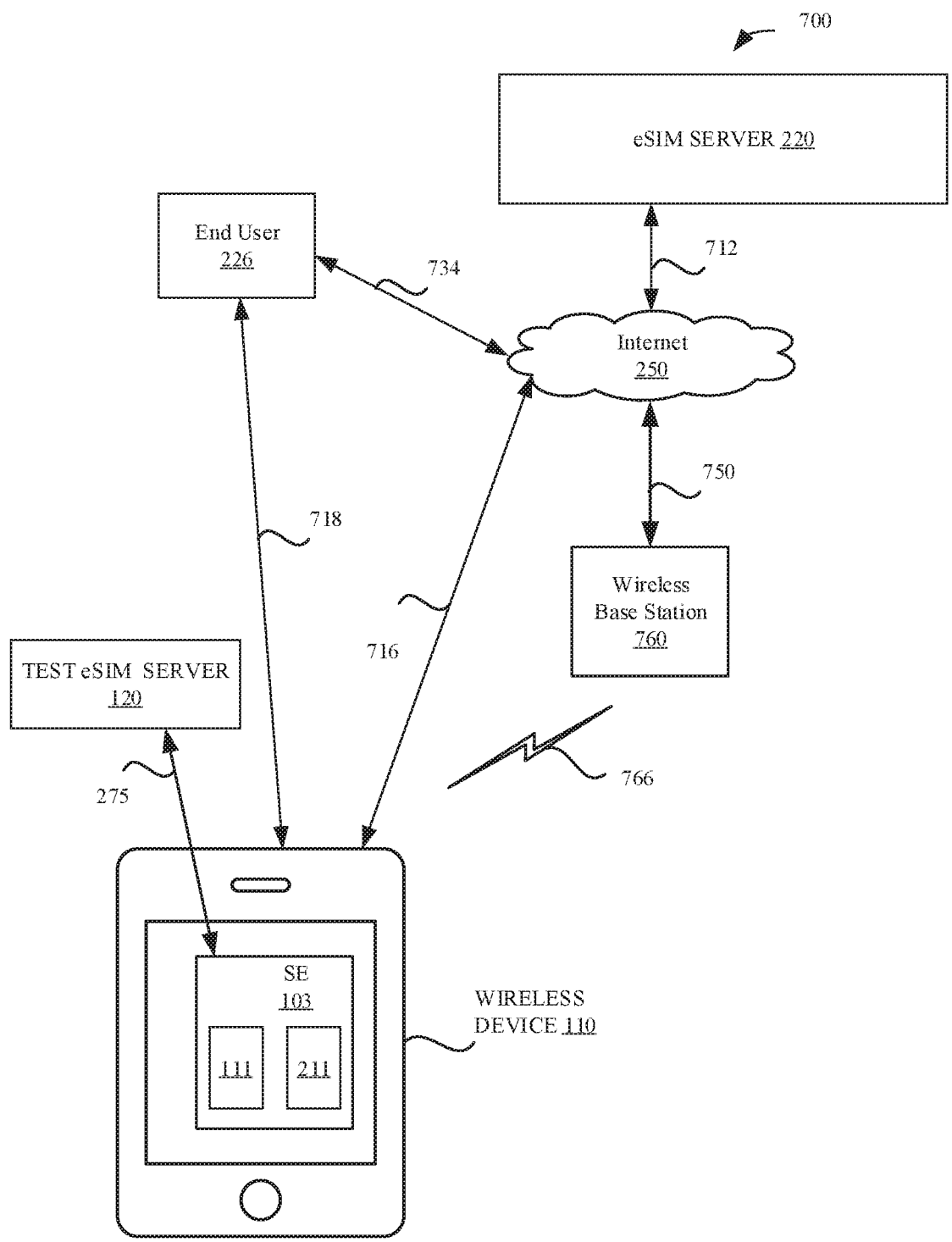
FIG. 7 illustrates the wireless device with an SE and with a profile installed in communication with an end user, and in communication via a wireless base station and/or the Internet with various entities such as servers, according to some embodiments.

FIG. 7 illustrates example connection methods for profile installations based on privilege level in a system 700. Test eSIM server 120, which may be test equipment is illustrated (similar to FIG. 1A). End user 226 can manage wireless device 110 using interface 718 which can convey end user actions. This is a generalized overview, as, in general, end user 226 and test eSIM server 120 are not present at the same time. The end user 226 can also remotely manage wireless device 110 via the Internet 250 using interface 734. The wireless device 110 is shown connected to a wireless base station 760. The wireless base station 760 communicates with the wireless device 110 via a wireless link 766. The wireless base station 760 can be an Institute of Electronic and Electrical Engineers 802.11 Wireless Fidelity (IEEE 802.11 Wi-Fi) access point (AP) or the wireless base station 760 can be, for example, a cellular mobile network base station. Examples of cellular mobile network base stations are a 2G or 3G base station or an LTE eNode B.

A bound profile package with the test profile 111 or the operational profile 211 or the provisioning profile 412 in encrypted form, in some embodiments, is downloaded from the eSIM server 220 to the wireless device 110. The eSIM server 220 can be connected to the Internet 250 via connection 712, to which the wireless device 110 can also be directly connected, e.g., via connection 716, or indirectly connected through wireless base station 760, which itself is connected to the Internet 250 via connection 750. In some instances, the test eSIM server 120 downloads a BPP representing the test profile 111 directly to the wireless device 110.

Variety of Radio Access Technologies

Wireless devices and mobile devices in particular, can incorporate multiple different radio access technologies (RATs) to provide connections through different wireless networks that offer different services and/or capabilities. A wireless device can include hardware and software to support a wireless personal area network ("WPAN") according to a WPAN communication protocol, such as those standardized by the Bluetooth® special interest group ("SIG") and/or those developed by Apple referred to as an Apple Wireless Direct Link (AWDL). The wireless device can discover compatible peripheral wireless devices and can establish connections to these peripheral wireless devices located in order to provide specific communication services through a WPAN. In some situations, the wireless device can act as a communications hub that provides access to a wireless local area network ("WLAN") and/or to a wireless wide area network ("WWAN") to a wide variety of services that can be supported by various applications executing on the wireless device. Thus, communication capability for an accessory wireless device, e.g., without and/or not configured for WWAN communication, can be extended using a local WPAN (or WLAN) connection to a companion wireless device that provides a WWAN connection. Alternatively, the accessory wireless device can also include wireless circuitry for a WLAN connection and can originate and/or terminate connections via a WLAN connection. Whether to use a direct connection or a relayed connection can depend on performance characteristics of one or more links of an active communication session between the accessory wireless device and a remote device. Fewer links (or hops) can provide for lower latency, and thus a direct connection can be preferred; however, unlike a legacy circuit-switched connection that provides a dedicated link, the direct connection via a WLAN can share bandwidth with other wireless devices on the same WLAN and/or with the backhaul connection from the access point that manages the WLAN. When performance on the local WLAN connection link and/or on the backhaul connection degrades, a relayed connection via a companion wireless device can be preferred. By monitoring performance of an active communication session and availability and capabilities of associated wireless devices (such as proximity to a companion wireless device), an accessory wireless device can request transfer of an active communication session between a direction connection and a relayed connection or vice versa.

In accordance with various embodiments described herein, the terms "wireless communication device," "wireless device," "mobile device," "mobile station," "wireless station", "wireless access point", "station", "access point" and "user equipment" (UE) may be used herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) long term evolution (LTE), LTE Advanced (LTE-A), and/or 5G or other present or future developed advanced cellular wireless networks.

The wireless device, in some embodiments, can also operate as part of a wireless communication system, which can include a set of client devices, which can also be referred to as stations, client wireless devices, or client wireless devices, interconnected to an access point (AP), e.g., as part of a WLAN, and/or to each other, e.g., as part of a WPAN and/or an "ad hoc" wireless network, such as a Wi-Fi direct connection. In some embodiments, the client device can be any wireless device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; IEEE 802.11ax; or other present or future developed IEEE 802.11 technologies.

Additionally, it should be understood that the wireless devices described herein may be configured as multi-mode wireless communication devices that are also capable of communicating via different third generation (3G) and/or second generation (2G) RATs. In these scenarios, a multi-mode wireless device or UE can be configured to prefer attachment to LTE networks offering faster data rate throughput, as compared to other 3G legacy networks offering lower data rate throughputs. For instance, in some implementations, a multi-mode wireless device or UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

Representative Exemplary Apparatus

Figure 8:
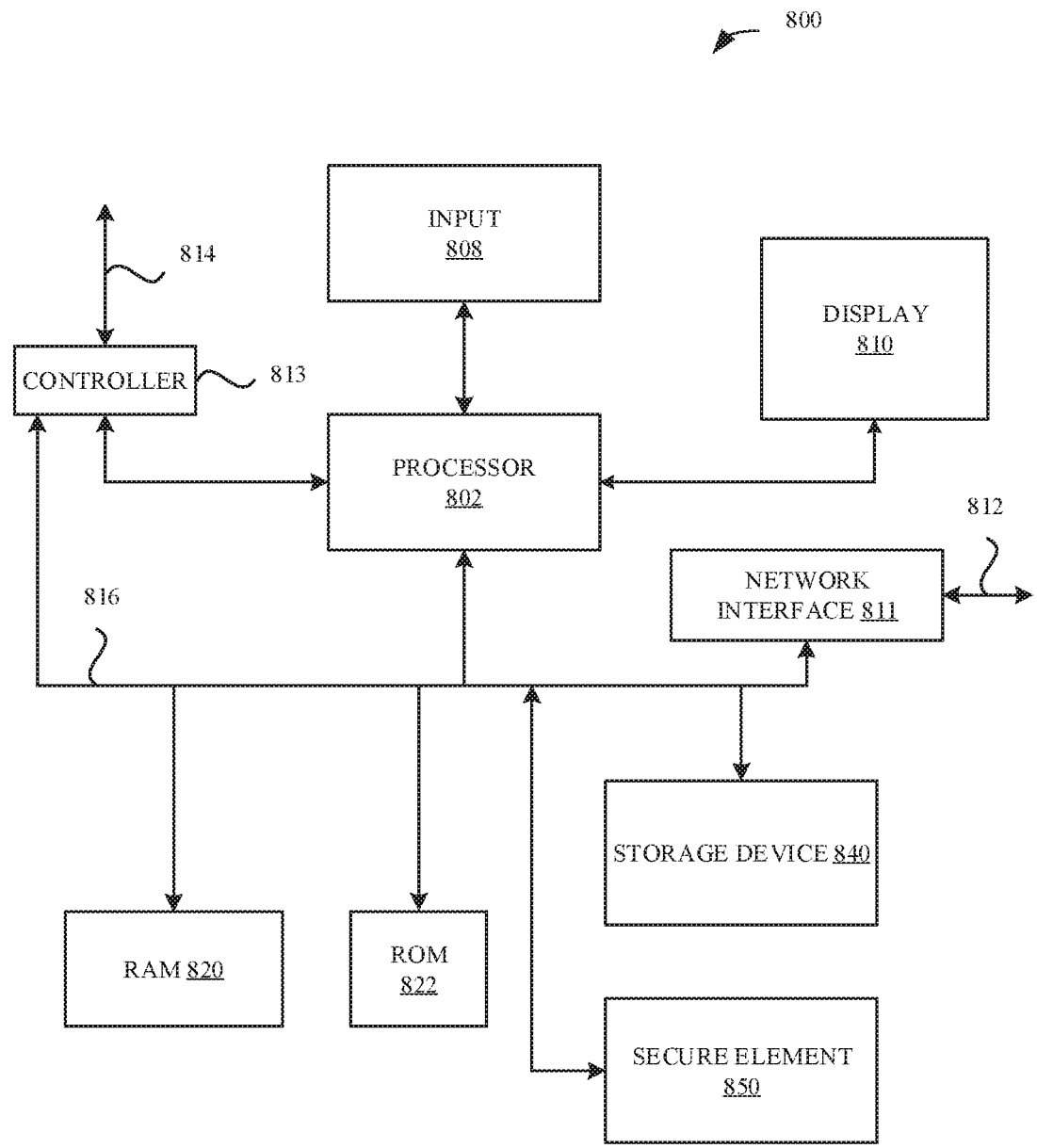
FIG. 8 illustrates an exemplary apparatus for implementation of the embodiments disclosed herein, according to some embodiments.

FIG. 8 illustrates in block diagram format an exemplary computing device 800 that can be used to implement the various components and techniques described herein, according to some embodiments. In particular, the detailed view of the exemplary computing device 800 illustrates various components that can be included in the test eSIM server 120, the eSIM server 220, the CI 130, the CA 230, the wireless device 110, or the SE 103 of FIGS. 1A, 2A, 2B, 2C, 2D, 2E, 4, and 6. As shown in FIG. 8, the computing device 800 can include a processor 802 that represents a microprocessor or controller for controlling the overall operation of computing device 800. In some embodiments, the computing device 800 can also include a user input device 808 that allows a user of the computing device 800 to interact with the computing device 800. For example, in some embodiments, the user input device 808 can take a variety of forms, such as a button, keypad, dial, touch screen, audio input interface, visual/image capture input interface, input in the form of sensor data, etc. In some embodiments, the computing device 800 can include a display 810 (screen display) that can be controlled by the processor 802 to display information to the user (for example, information relating to incoming, outgoing, or active communication session). A data bus 816 can facilitate data transfer between at least a storage device 840, the processor 802, and a controller 813. The controller 813 can be used to interface with and control different equipment through an equipment control bus 814. The computing device 800 can also include a network/bus interface 811 that couples to a data link 812. In the case of a wireless connection, the network/bus interface 811 can include wireless circuitry, such as a wireless transceiver and/or baseband processor. The computing device 800 can also include a secure element 850. The secure element 850 can include an eUICC or an UICC.

The computing device 800 also includes a storage device 840, which can comprise a single storage or a plurality of storages (e.g., hard drives), and includes a storage management module that manages one or more partitions within the storage device 840. In some embodiments, storage device 840 can include flash memory, semiconductor (solid state) memory or the like. The computing device 800 can also include a Random Access Memory ("RAM") 820 and a Read-Only Memory ("ROM") 822. The ROM 822 can store programs, utilities or processes to be executed in a non-volatile manner. The RAM 820 can provide volatile data storage, and stores instructions related to the operation of the computing device 800.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. In some instances, the computer readable medium is a non-transitory computer readable medium. The computer readable medium is any data storage device that can store data which can thereafter be read by a computer system. Examples of the computer readable medium include read-only memory, random-access memory, CD-ROMs, DVDs, magnetic tape, hard storage drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method comprising:
by a secure element (SE):
receiving a message including a signature;
verifying the signature with a key;
receiving profile metadata, wherein the profile metadata includes a profile type;
when installation of the profile type is permitted by a privilege level:
permitting download of a bound profile package (BPP) associated with the profile type;
when installation of the profile type is disallowed by the privilege level:
rejecting download of the BPP; and
when i) the profile type includes a test profile type, an operational profile type, or a provisioning profile type, and ii) the privilege level includes installation correspondingly of test profiles, operational profiles, or provisioning profiles:
installing, on the SE, a corresponding test profile, operational profile, or provisioning profile using profile components from the BPP.

2. The method of claim 1, further comprising:
before the verifying the signature with the key:
obtaining the key from a non-volatile memory of the SE, wherein the key was burned into the non-volatile memory at a time of SE manufacture.

3. The method of claim 2, wherein the privilege level is associated with the key.

4. The method of claim 3, wherein:
i) the key is included in a plurality of keys,
ii) a first key of the plurality of keys is associated with a high privilege level including installation of operational profiles,
iii) a second key of the plurality of keys is associated with a moderate privilege level including installation of provisioning profiles and test profiles but not operational profiles,
iv) a third key of the plurality of keys is associated with a hybrid privilege level including installation of test profiles and installation of operational profiles but not installation of provisioning profiles, and
v) a fourth key of the plurality of keys is associated with a low privilege level including installation of test profiles but not installation of operational profiles and not installation of provisioning profiles.

5. The method of claim 1, wherein the privilege level is not associated with the key.

6. The method of claim 5, further comprising:
before processing the BPP:
receiving, from a source of the BPP, a certificate; and
parsing the privilege level from an extension field of the certificate.

7. The method of claim 1, wherein:
the profile type includes the test profile type,
the privilege level is limited to installation of test profiles, and
the installing comprises installing the test profile.

8. The method of claim 7, further comprising:
subsequent to the installing the test profile:
receiving a profile management command from an eSIM server;
performing, by an operating system (OS) of the SE, the profile management command on the test profile.

9. The method of claim 8, wherein the profile management command includes an enable profile command, a disable profile command, a delete profile command, a list profiles command, or a set nickname profile command.

10. The method of claim 1, wherein:
the profile type includes the operational type,
the privilege level includes installation of operational profiles, and
the installing comprises installing the operational profile.

11. The method of claim 10, further comprising:
subsequent to the installing the operational profile on the SE:
performing an authentication and key agreement (AKA) transaction with a mobile network operator (MNO) associated with the operational profile, wherein the AKA uses a subscriber key (K) included in the operational profile; and
providing a user of a wireless device with voice or data services, wherein the SE is present in the wireless device.

12. The method of claim 1, wherein:
the profile type includes the provisioning profile type,
the privilege level includes installation of provisioning profiles, and
the installing comprises installing the provisioning profile.

13. A secure element (SE) of a wireless device, the SE comprising a processor and a memory storing instructions that when executed by the processor cause the SE to perform a set of actions that include:
receiving a message including a signature;
verifying the signature with a key;
receiving profile metadata, wherein the profile metadata includes a profile type;
when installation of the profile type is permitted by a privilege level:
permitting download of a bound profile package (BPP) associated with the profile type;
when installation of the profile type is disallowed by the privilege level:
rejecting download of the BPP; and
when i) the profile type includes a test profile type, an operational profile type, or a provisioning profile type, and ii) the privilege level includes installation correspondingly of test profiles, operational profiles, or provisioning profiles:
installing, on the SE, a corresponding test profile, operational profile, or provisioning profile using profile components from the BPP.

14. The SE of claim 13, wherein the set of actions further include:
before the verifying the signature with the key:
obtaining the key from a non-volatile memory of the SE, wherein the key was burned into the non-volatile memory at a time of SE manufacture.

15. The SE of claim 14, wherein:
i) the privilege level is associated with the key,
ii) the key is included in a plurality of keys,
iii) a first key of the plurality of keys is associated with a high privilege level including installation of operational profiles,
iv) a second key of the plurality of keys is associated with a moderate privilege level including installation of provisioning profiles and test profiles but not operational profiles,
v) a third key of the plurality of keys is associated with a hybrid privilege level including installation of test profiles and installation of operational profiles but not installation of provisioning profiles, and
vi) a fourth key of the plurality of keys is associated with a low privilege level including installation of test profiles but not installation of operational profiles and not installation of provisioning profiles.

16. The SE of claim 13, wherein the privilege level is not associated with the key, and the set of actions further include:
before the processing the BPP:
receiving, from a source of the BPP, a certificate; and
parsing the privilege level from an extension field of the certificate.

17. The SE of claim 13, wherein:
the profile type includes the test profile type,
the privilege level is limited to installation of test profiles, and
the installing comprises installing the test profile.

18. The SE of claim 17, wherein the set of actions further include:
subsequent to the installing the test profile:
receiving a profile management command from an eSIM server;
performing, by an operating system (OS) of the SE, the profile management command on the test profile.

19. The SE of claim 13, wherein:
the profile type includes the operational type,
the privilege level includes installation of operational profiles, and
the installing comprises installing the operational profile; and the set of actions further include subsequent to the installing the operational profile on the SE:
- performing an authentication and key agreement (AKA) transaction with a mobile network operator (MNO) associated with the operational profile, wherein the AKA uses a subscriber key (K) included in the operational profile; and
- providing a user of a wireless device with voice or data services, wherein the SE is present in the wireless device.

20. The SE of claim 13, wherein:
the profile type includes the provisioning profile type,
the privilege level includes installation of provisioning profiles, and
the installing comprises installing the provisioning profile.

* * * * *